(12) United States Patent
Xue et al.

(10) Patent No.: US 9,582,143 B2
(45) Date of Patent: Feb. 28, 2017

(54) USER INPUT DEVICE AND METHOD

(71) Applicants: Lai Xue, Shanghai (CN); Darren Lim, Singapore (SG)

(72) Inventors: Lai Xue, Shanghai (CN); Darren Lim, Singapore (SG)

(*) Notice: Subject to any disclaimer, the term of this patent is extended or adjusted under 35 U.S.C. 154(b) by 40 days.

(21) Appl. No.: 14/495,655

(22) Filed: Sep. 24, 2014

(65) Prior Publication Data

US 2015/0199107 A1 Jul. 16, 2015

Related U.S. Application Data

(63) Continuation of application No. 14/153,793, filed on Jan. 13, 2014.

(60) Provisional application No. 61/751,958, filed on Jan. 14, 2013, provisional application No. 61/814,176, filed on Apr. 19, 2013, provisional application No.
(Continued)

(51) Int. Cl.
| | | |
|---|---|---|
| G06F 3/0481 | (2013.01) | |
| G06F 3/023 | (2006.01) | |
| G06F 3/01 | (2006.01) | |
| G06F 3/0488 | (2013.01) | |
| G06F 1/16 | (2006.01) | |
| G06F 3/042 | (2006.01) | |
| G06F 3/044 | (2006.01) | |

(52) U.S. Cl.
CPC .......... *G06F 3/04815* (2013.01); *G06F 1/169* (2013.01); *G06F 1/1662* (2013.01); *G06F 1/1686* (2013.01); *G06F 3/017* (2013.01); *G06F 3/0233* (2013.01); *G06F 3/044* (2013.01); *G06F 3/0425* (2013.01); *G06F 3/0426* (2013.01); *G06F 3/0488* (2013.01); *G06F 3/04883* (2013.01); *G06F 3/04886* (2013.01); *G06F 2203/04808* (2013.01)

(58) Field of Classification Search
CPC .. G06F 1/1673; G06F 3/0426; G06F 3/04886; G06F 2203/04809; G06F 3/04815; G06F 1/169; G06F 1/1662; G06F 3/044; G06F 1/1686; G06F 3/0425; G06F 3/04883; G06F 3/0488; G06F 3/0233; G06F 2203/04808
USPC ......................................... 345/156, 160, 168
See application file for complete search history.

(56) References Cited

U.S. PATENT DOCUMENTS

| | | |
|---|---|---|
| 5,495,077 A | 2/1996 | Miller et al. |
| 5,914,465 A | 6/1999 | Allen et al. |
| 7,659,887 B2 | 2/2010 | Larsen et al. |
| (Continued) | | |

FOREIGN PATENT DOCUMENTS

EP        0445237 B1    11/1996

OTHER PUBLICATIONS

U.S. Appl. No. 14/153,793, "User Input Determination," filed Jan. 13, 2014.

*Primary Examiner* — Aneeta Yodichkas
(74) *Attorney, Agent, or Firm* — Kevin Keener; Keener and Associates P.C.

(57) ABSTRACT

In accordance with one implementation, a method is illustrated that allows a computing device to determine a user input. The method includes detecting one or more user input objects in a 3-dimensional field relative to a 2-dimensional surface. The method also includes determining coordinates for the one or more user input objects relative to the 2-dimensional surface. And, the method further includes determining a user input based on the coordinates.

6 Claims, 16 Drawing Sheets

Related U.S. Application Data

61/828,181, filed on May 29, 2013, provisional application No. 61/812,824, filed on Apr. 17, 2013.

(56) References Cited

U.S. PATENT DOCUMENTS

| | | |
|---|---|---|
| 7,786,980 B2 | 8/2010 | Lashina |
| 8,760,418 B2 | 6/2014 | Miyazawa et al. |
| 2004/0041791 A1 | 3/2004 | Dunker |
| 2006/0181511 A1 | 8/2006 | Woolley |
| 2007/0091070 A1* | 4/2007 | Larsen et al. ............... 345/168 |
| 2010/0231522 A1* | 9/2010 | Li ............................... 345/169 |
| 2011/0291988 A1* | 12/2011 | Bamji et al. ................ 345/175 |
| 2012/0206363 A1* | 8/2012 | Kyprianou et al. ......... 345/168 |
| 2012/0306752 A1 | 12/2012 | Hosoya et al. |
| 2013/0257734 A1* | 10/2013 | Marti .................. G06F 1/1686 345/168 |
| 2014/0062875 A1* | 3/2014 | Rafey .................. G06F 17/276 345/158 |

* cited by examiner

USER INPUT DEVICE AND METHOD

CROSS-REFERENCE TO RELATED APPLICATIONS

The present application claims the benefit under 35 U.S.C. §119 of U.S. Provisional Patent Application No. 61/751,958, entitled "Computer Keyboard That Senses Hovering and Multitouch Gestures Through a Matrix of Proximity Sensors," and filed on Jan. 14, 2013, which is incorporated by reference herein in its entirety for all that it discloses or teaches and for all purposes. The present application also claims the benefit under 35 U.S.C. §119 of U.S. Provisional Patent Application 61/812,824, entitled "Method of Distinguishing Events of Touch and Type Input," and filed on Apr. 17, 2013, which is also incorporated by reference herein in its entirety for all that it discloses or teaches and for all purposes. The present application also claims the benefit under 35 U.S.C. §119 of U.S. Provisional Patent Application 61/814,176, entitled "Interface That Computes Two-Dimensional Coordinates From Three-Dimensional Input," and filed on Apr. 19, 2013, which is also incorporated by reference herein in its entirety for all that it discloses or teaches and for all purposes. The present application also claims the benefit under 35 U.S.C. §119 of U.S. Provisional Patent Application 61/828,181, entitled "Interface That Computed Two-Dimensional Coordinates From Three-Dimensional Input," and filed on May 29, 2013 which is also incorporated by reference herein in its entirety for all that it discloses or teaches and for all purposes. The present application also is a continuation of and claims the benefit of U.S. Non-Provisional patent application Ser. No. 14/153,793, entitled "User Input Determination," and filed on Jan. 13, 2014, which is also incorporated by reference herein in its entirety for all that it discloses or teaches and for all purposes.

BACKGROUND

Over the years, people have developed different ways of communicating user input commands to computing devices, such as personal computers. Examples of some devices that have evolved over the years are keyboards, mouse pads, and touch pads, as well as software that converts spoken commands into input commands. Nevertheless, there still remains room for improvement in the way that users communicate with and efficiently utilize computing devices.

SUMMARY

In accordance with one implementation, a method is illustrated that allows a computing device to determine a user input. The method includes detecting one or more user input objects in a 3-dimensional field relative to a 2-dimensional surface. The method also includes determining coordinates for the one or more user input objects relative to the 2-dimensional surface. And, the method further includes determining a user input based on the coordinates.

Another implementation discloses an apparatus that determines a user input. The apparatus includes a 2-dimensional surface and an object detection circuit configured to detect one or more user input objects in a 3-dimensional field relative to the 2-dimensional surface. In addition, the object detection circuit is configured to determine coordinates for the one or more user input objects relative to the 2-dimensional surface. Also included is a user input detector configured to determine a user input based on the coordinates.

In another implementation, one or more computer readable media are provided. The computer readable media encode computer-executable instructions for executing on a computer system a computer process. The computer process can include: detecting one or more user input objects in a 3-dimensional field relative to a 2-dimensional surface; determining coordinates for the one or more user input objects relative to the 2-dimensional surface, and determining a user input based on the coordinates.

In one implementation, a device is provided that includes one or more keys; one or more capacitive sensors disposed in the one or more keys; and an object detector configured to detect one or more user input objects in a 3-dimensional field above the one or more keys.

In another implementation, a method is provided that includes receiving sensor data indicative of a touch event on a keyboard; waiting for a predetermined period of time to determine if key press data is received; and signaling a touch event if no key press data is received during the predetermined period of time while alternatively signaling a key press event if key press data is received during the predetermined period of time. The method can be used for example to discriminate between a touch event and a type event on a key surface of a keyed device.

In still another implementation, an apparatus is provided that includes a device that includes one or more keys; a plurality of sensors disposed in the one or more keys; and a user input detector configured to receive sensor data indicative of a touch event on the keyed device. The user input detector is further configured to wait for a predetermined period of time to determine if key press data is received. The user input detector signals a touch event if no key press data is received during the predetermined period of time while alternatively signaling a key press event if key press data is received during the predetermined period of time.

In yet another implementation, one or more computer-readable storage media are provided that encode computer-executable instructions for executing on a computer system a computer process. The process includes receiving sensor data indicative of a touch event on a key; waiting for a predetermined period of time to determine if key press data is received; and signaling a touch event if no key press data is received during the predetermined period of time while alternatively signaling a key press event if key press data is received during the predetermined period of time.

This Summary is provided to introduce a selection of concepts in a simplified form that are further described below in the Detailed Description. This Summary is neither intended to identify key features or essential features of the claimed subject matter nor is it intended to limit the scope of the claimed subject matter. Other features, details, and utilities, of the claimed subject matter will be apparent from the following Detailed Description of various implementations as further illustrated in the accompanying drawings.

DETAILED DESCRIPTION

Much of the interaction that a computer user has with his or her computer is by typing or keying in information and commands via a keyboard. As a result, the user's hands are often positioned in a typing position. It can be inefficient for the user to have to move a hand to a mouse or touch pad or even move a finger to a touch sensitive surface of a display in order to interface with a graphical user interface on a display.

In accordance with one implementation, a user can efficiently interface with a graphical user interface by using the space above a surface, such as the space above a keyboard surface or above another surface, to signal an input to the graphical user interface. One or more sensors in proximity to the surface detect the position of a user interface object(s) (e.g., a user's finger(s), a stylus, a pen, or some other pointing device) relative to the surface. The positions of the user's fingertip(s), for example, are then utilized to determine an input to the computer. Moreover, the position of the fingertip(s) can be translated from their position(s) relative to the surface to position(s) on the display. Thus, for example, a fingertip detected above a keyboard surface can be shown as a circle on a display. As the user moves his or her fingertip above the surface, the movement is detected and the circle is displayed to move in a corresponding manner on the display surface. As the user moves the finger down to the surface, an actual input similar to a mouse click can be generated as an input.

Figure 1:
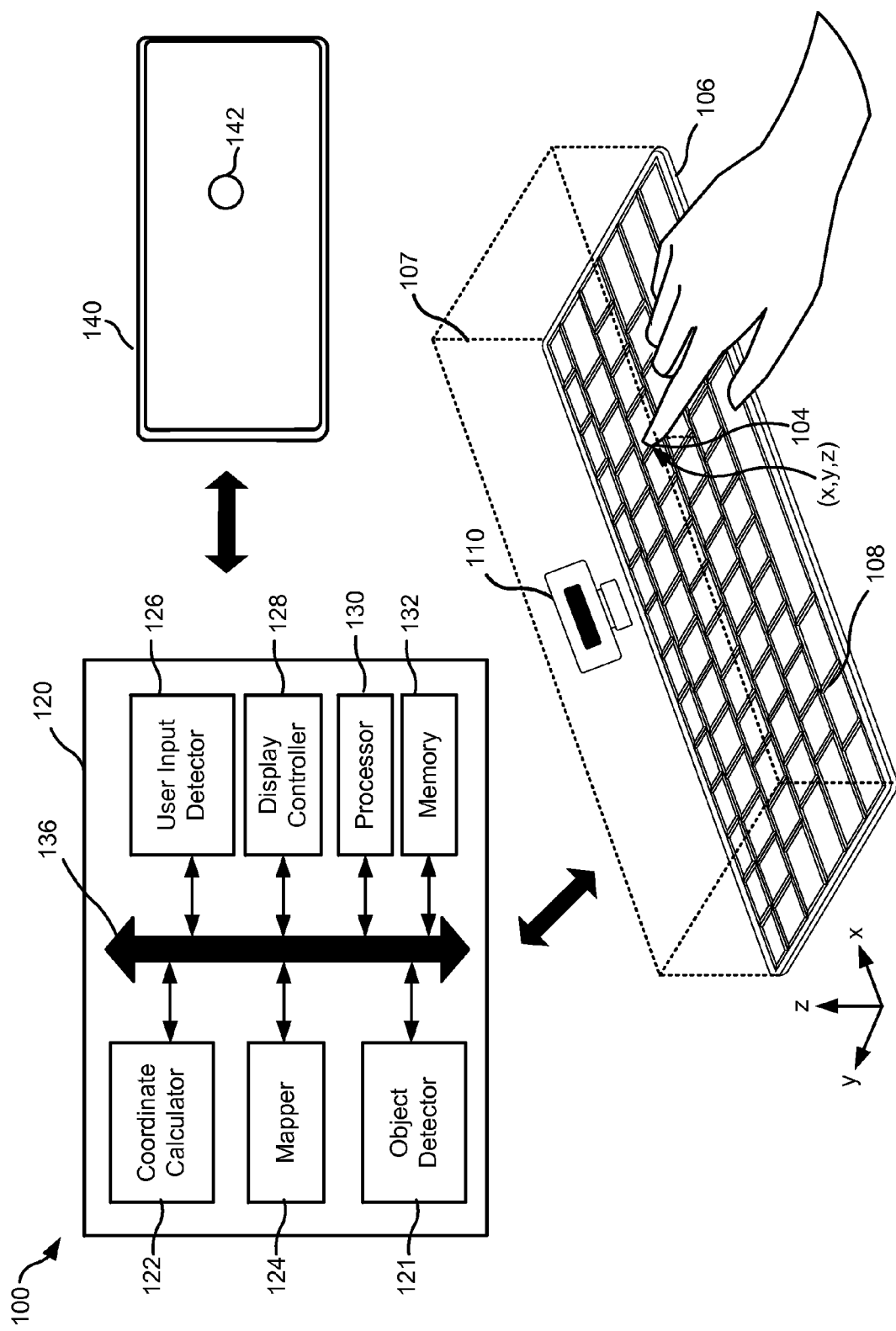
FIG. 1 illustrates an apparatus for determining user inputs, in accordance with one implementation.

FIG. 1 shows one implementation of a system 100 for implementing a user input determination system. In accordance with this implementation, a user input object, such as a user's fingertip or stylus, is detected in a 3-dimensional field. Coordinates for the fingertip can then be determined and mapped such that the fingertip is displayed as a cursor or other display element on a display. The user's fingertip does not have to touch a surface—instead, it can simply be detected in free space within the 3-dimensional field. In addition, the user's fingertip can transition to perform a touch or type event on a keyboard, touch screen, reference surface or other interface.

In FIG. 1, a fingertip 104 of a user is shown disposed above a keyboard 106. The tops of the keys of the keyboard define a 2-dimensional surface 108 that serves as a reference surface. A 3-dimensional field 107 extends above the reference surface and is shown by dashed lines. The position of the user's fingertip within the 3-dimensional field is designated in accordance with a coordinate system. For example, an x, y, z coordinate system is used in this example. The position of the user's fingertip in this example is shown to have a position $(x_1, y_1, z_1)$ within the 3-dimensional field.

The 2-dimensional surface corresponds with the 3-dimensional field. For example, the 2-dimensional surface can form a reference surface in an x-y plane at the bottom of the 3-dimensional field. In the example of FIG. 1, the surface delineated by the tops of the keys on the keyboard forms the reference surface. It should be appreciated, however, that other surfaces could be utilized. For example, the surface of a desk or table top could be utilized. Even a virtual plane within a three dimensional field could be utilized. Thus, the use of a keyboard in FIG. 1 is an example only.

A variety of object detection circuits can be used to detect the presence of an input object. An object detection circuit can include one or more sensors, an object detector, a coordinate calculator, a processor, and a memory, for example. FIG. 1 shows a camera 110 that can be used as part of an object detection circuit to detect a user's fingertip. Other sensors, such as capacitive sensors in the keys of a keyboard may be used, as well. The sensors generate raw data that is used by an object detector 121 to determine the presence of user input object(s). When one or more sensors generate data indicating that one or more objects is in a sensor field, the object detector can signal that a user input object(s) has entered the sensor field. The sensor data can be converted by a coordinate calculator 122 to provide coordinates within the 3-dimensional field 107 (shown by dashed lines and the top surface of the keyboard) for any detected object(s). A processor 130 can be used by the coordinate calculator to convert the sensor data into coordinate data. In some implementations, the sensor(s), object detector, coordinate calculator, and processor can be configured as an integrated unit.

A computing device 120 is shown in FIG. 1 for converting the data gathered by the sensor(s) into display data for a display. For example, FIG. 1 shows a mapper 124. The mapper is configured to map coordinates corresponding to the position of at least one of the input objects relative to the 2-dimensional surface to the display surface. For example, the mapper can take X, Y, Z coordinate data that was obtained by the coordinate calculator and convert that data into display data. FIG. 1 shows a display element 142 displayed in a particular position on the display screen. The position of the display element is based upon the originally determined $x_1$, $y_1$ coordinates of the user's detected fingertip while the size of the circle that is displayed is based upon the previously determined $z_1$ coordinate.

For example, display elements can be rendered by scaling the width and height of a rectangular plane of the 3-dimensional field to have the same width-to-height ratio as a display. In this manner, the coordinates of user input objects can be translated to display coordinates for a display element.

A user input detector 126 determines what to do with the data produced by the mapper. In the example shown in FIG. 1, the data is communicated to a display controller 128 that displays circle 142 on the display.

The user input detector can also be used to detect, for example, user commands, gestures, touch events, and type events, as well as multi-finger or single-finger modes. For example, the user input detector can analyze a sequence of fingertip coordinate data and determine a gesture that has been performed by the user. If the gesture matches a predefined gesture, the user input detector can signal a command that corresponds with that predefined gesture. As another example, the user input detector can monitor the coordinate data associated with a fingertip. If the fingertip is placed at the reference surface position for a predefined period of time, the user input detector can signal that a touch event has occurred. Moreover, the user input detector can also signal a change in modes of operation (e.g., from fingertip input to keyboard input) when a fingertip is placed against the reference surface for an extended period of time.

The object detector in the example of FIG. 1 can limit the sensor field to a size in the x-y plane that is proportional to the size of the display. This allows the user to experience an absolute-position system, as opposed to a relative-position system. An absolute-position system allows the user to place a user input object(s) into the sensor field and to see the user input object(s) displayed on the display in the corresponding position of the display. A relative-position system such as a mouse or touchpad would require the user to move a cursor to the desired location on a display. Thus, an absolute-position system is very intuitive for a user to implement.

Moreover, the system implemented by the apparatus in FIG. 1 allows a plane of touch to be separate from a plane of display (or view). While absolute-position sensing is utilized, absolute-positioning is performed in a plane separate from the plane of the display.

Figure 2:
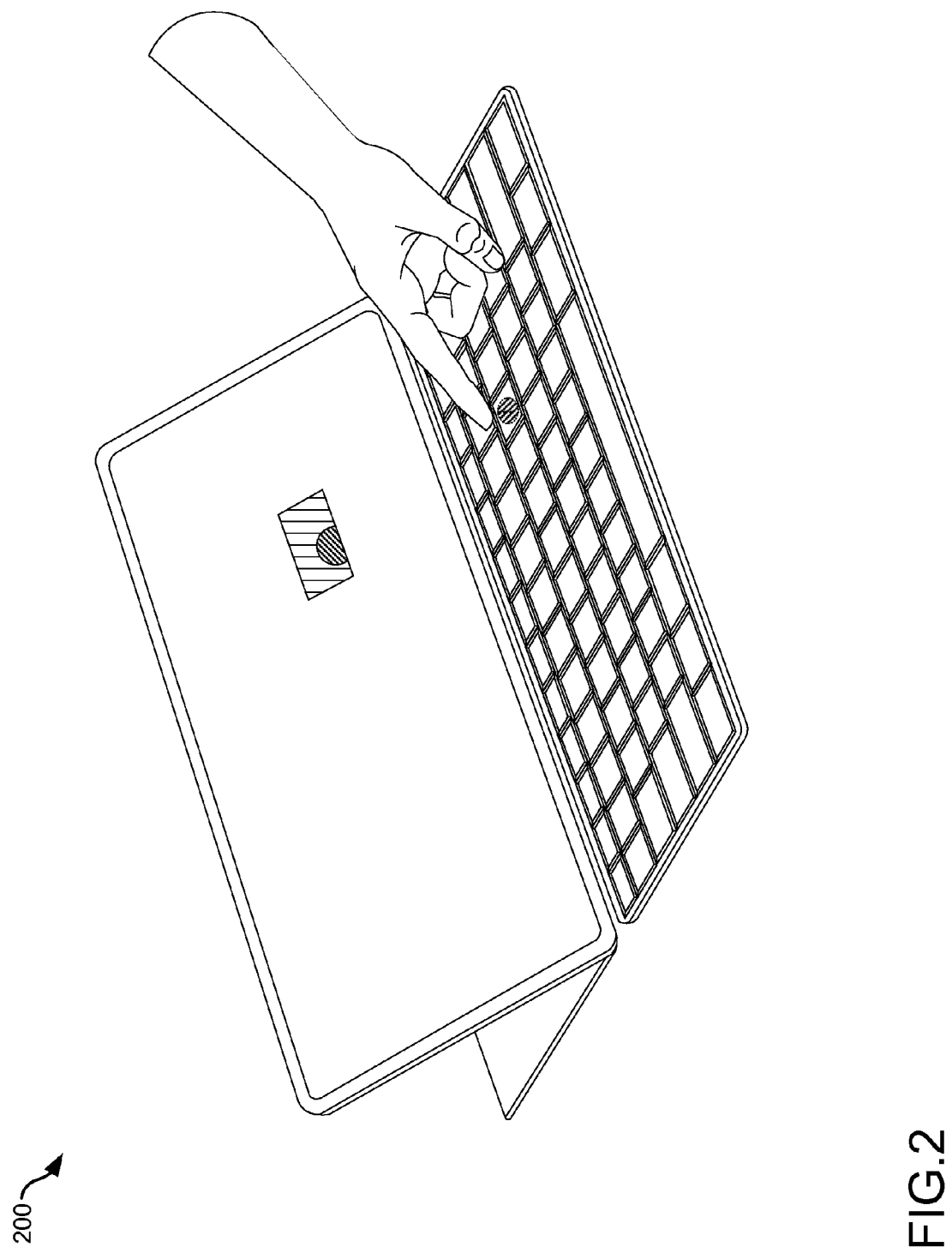
FIG. 2 illustrates detection of a user's fingertip and display, in accordance with one implementation.

FIG. 2 shows an example of a user interacting with a computer system 200 that implements a user input determination system. In FIG. 2, a user's finger is positioned above a keyboard surface. The keyboard surface forms a reference surface. As the user moves his or her finger through the space above the keyboard, the user's fingertip is detected by object detector(s) located in keys of the keyboard. Corresponding display data is generated and displayed on the display screen. As can be seen in FIG. 2, the X-Y position of the user's fingertip relative to the keyboard corresponds with the position of the circle displayed on the display screen.

Figure 3:
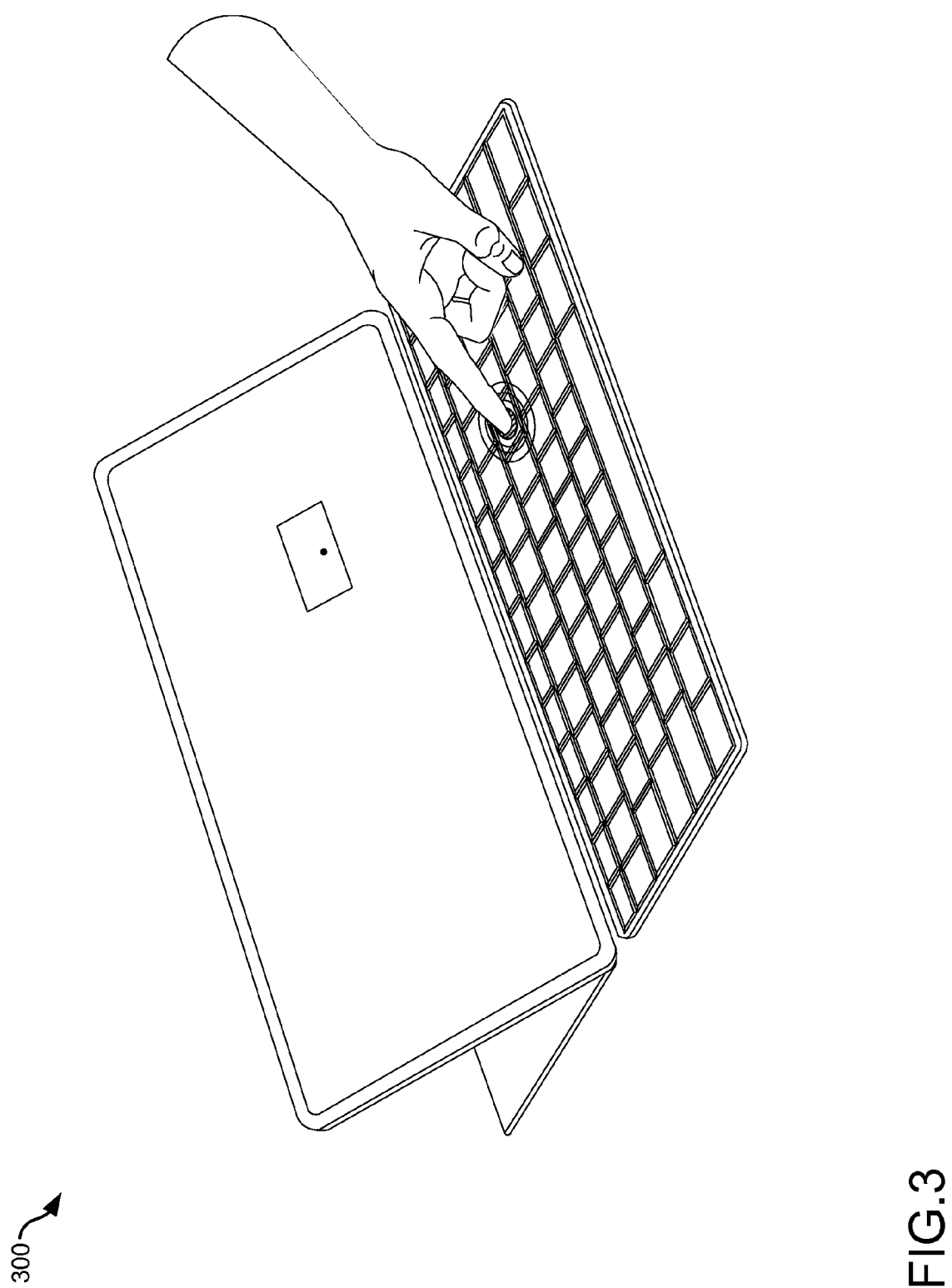
FIG. 3 illustrates detection and display of a touch event performed by a user, in accordance with one implementation.

FIG. 3 shows detection of a touch event performed by the user. In FIG. 3, the user's fingertip has come into contact with the keyboard of a computer system 300 for a predetermined period of time. This can simply be caused by the user's fingertip resting on the keyboard surface for a predetermined period of time. In this example, the user input determination system displays a dot on the display screen. Because the proximity of the user's fingertip has been detected to be at the reference surface, the user input determination system can determine that a touch event has occurred.

Such a touch event can be used by a user to interact with a graphical user interface. For example, if a graphical user interface is displaying a list of songs for selection, the user can move his or her fingertip relative to a reference surface, e.g., a keyboard, while watching the corresponding display element on the display. As the display element moves over the desired song, the user can touch the reference surface, e.g., the keyboard, to perform a touch event that selects the song.

Figure 4:
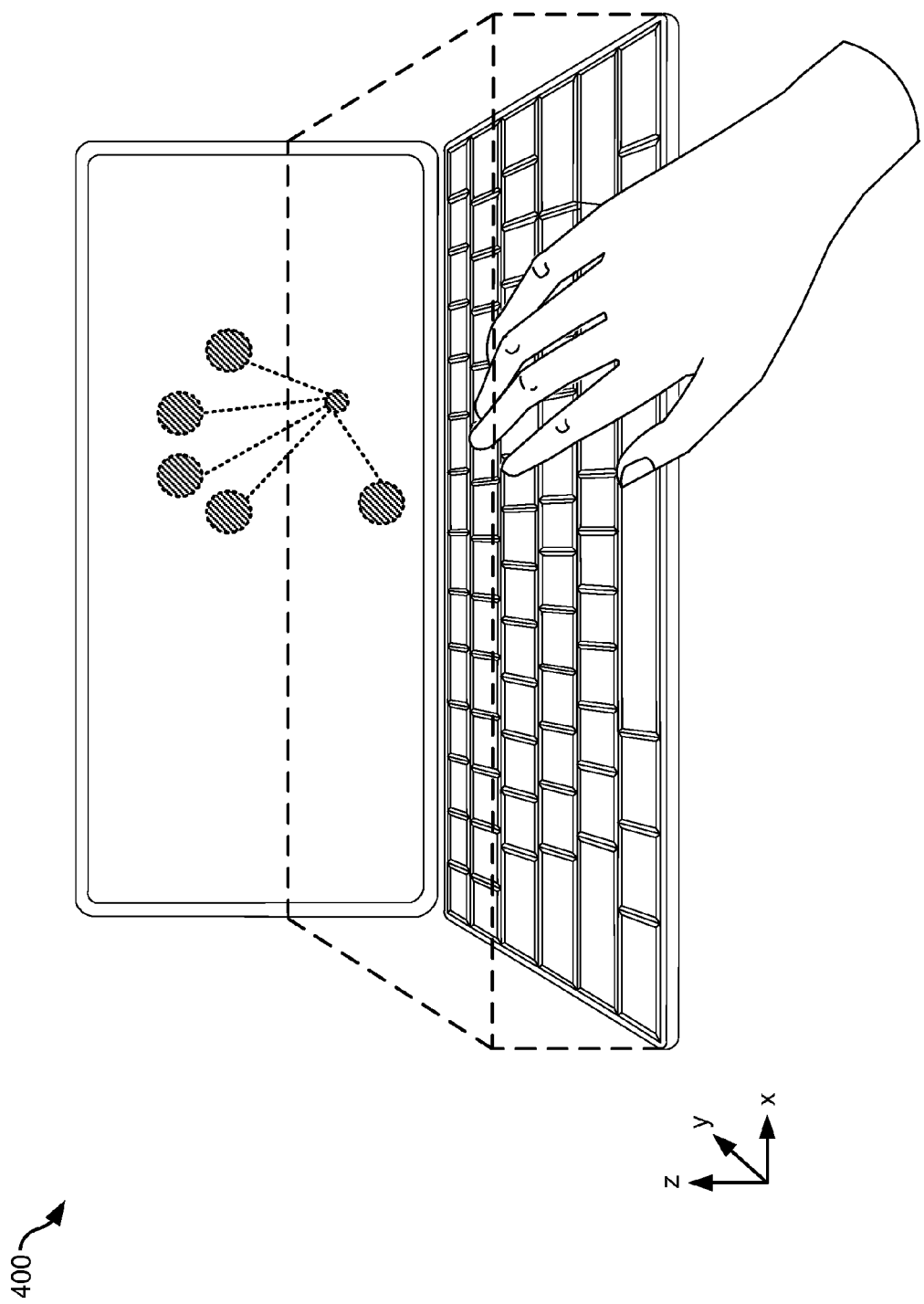
FIG. 4 illustrates detection of a user's fingertips and palm while in "hover" mode, in accordance with one implementation.

FIG. 4 shows a computer system 400. FIG. 4 illustrates that multiple user input objects can be detected at the same time. In FIG. 4, all the fingertips and the palm of a user's hand are positioned above a keyboard that is serving as a reference surface. The fingertips and palm are not touching the keyboard but are instead in the 3-dimensional field above the keyboard. This 3-dimensional field is delineated by the dashed lines and the surface of the keyboard. The user input determination system detects and displays the user input object information on the display as six circles. Because the palm of the user's hand is closer to the reference surface, the palm is displayed as a circle having a smaller diameter than the circles corresponding to the user's fingertips.

FIG. 4 also illustrates a "hover" mode for the user input determination system. Hover mode is when the user input determination system is detecting objects in the 3-dimensional field above a reference surface. During hover mode, detected user input objects can be displayed on the display. In addition, the user input determination system can also operate in "touch" mode and "type" mode. Touch mode is when the user input determination system detects and responds to a touch event. Type mode is when a depression of a key on a user interface device is detected and registered as an intended key depression event.

A touch event is triggered when a user's fingertip(s) (or other input object(s)) are placed in an interactive area. The interactive area could be the surface of a computer keyboard or even just a predetermined level of a 3-dimensional field.

A key-press event is triggered when a key is pressed down. If the key press event is triggered within a short period of time after the triggering of a touch event, type mode can be initiated. Alternatively, touch mode is maintained.

While in touch mode, pressing down of keys by a user need not trigger a key-press event. Thus, accidental pressing down of keys during touch mode for a short period of time will not terminate touch mode and initiate type mode. Rather a key-press event has to be for a sufficient pre-determined duration and with sufficient depression distance to make it clear that a key-press event is intended.

In accordance with one implementation, a method of discriminating between a touch event and a type event can be utilized. The method is initiated by operation 502 and includes reading an input, as shown by operation 504. A decision operation 506 determines whether a touch input has been detected. If the input that has been read does not match a touch input, then a new input reading is made. If the input reading is determined to be a touch input, however, then a timer can be initiated in operation 508. The timer can run for a few milliseconds. Decision operation 510 queries a routine to determine whether a key press event is detected. Decision operation repeats this routine until an interval count is reached. In operation 516, keyboard input(s) are read. In decision operation 518, if no key press is detected by the keyboard input, then the process can be repeated. If a key press is detected, then the interval timer can be stopped as shown by operation 520 and a keyboard event can be signaled as shown by operation 522. Thus, the keyboard input would override a touch event. If the decision operation in decision block 510 expires due to elapsed time or elapsed number of allocated iterations, the timer is stopped as shown by operation 512 and a touch event is signaled as shown by operation 514. After a touch event or type event is signaled, the process can begin again from operation 504. This implementation allows the same keypad, keyboard, or other device with key(s) to serve as both a touch and a type interface. This implementation can be accomplished because the system allows a type input to supersede a touch input when a type input is detected.

Figure 5:
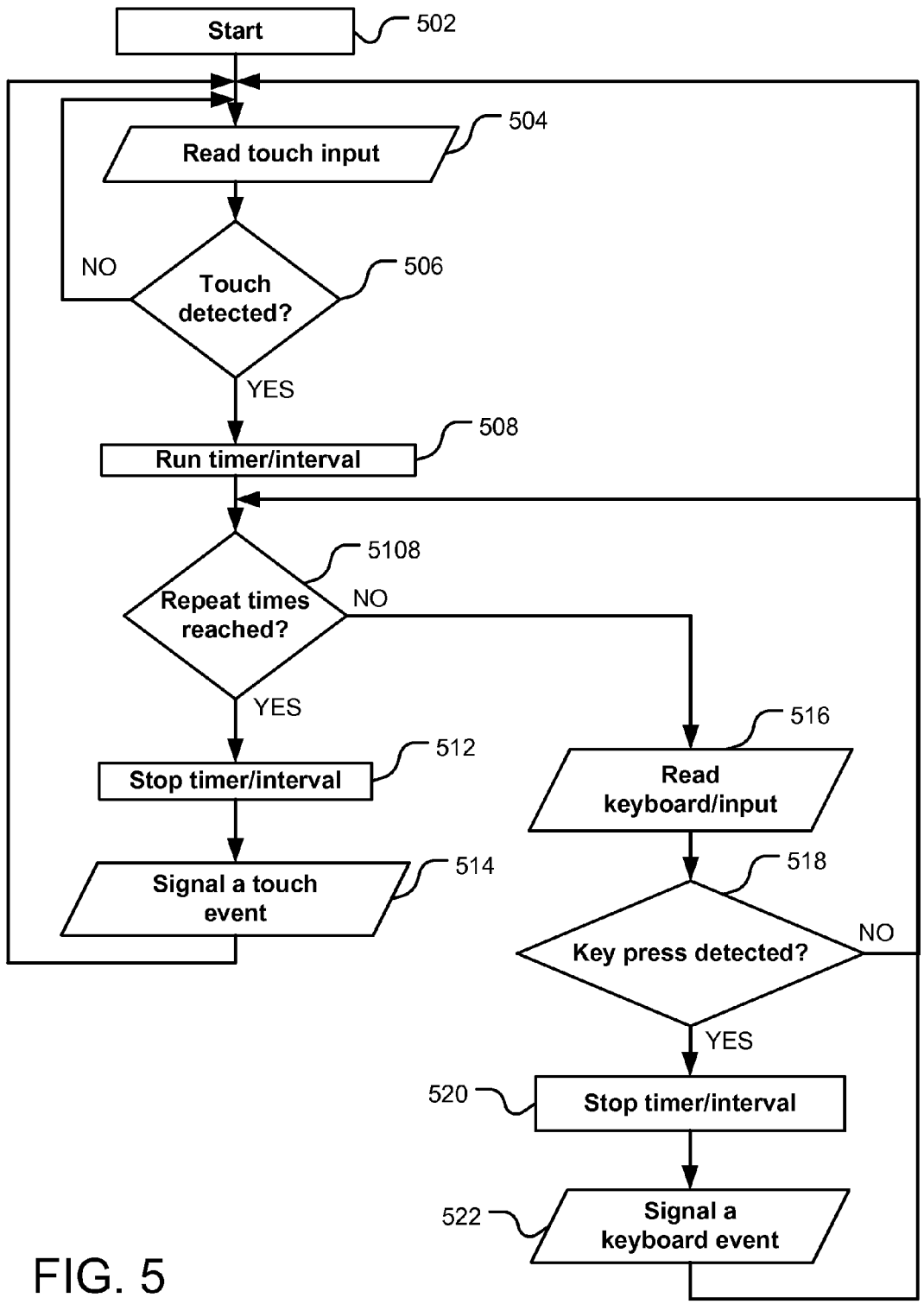
FIG. 5 illustrates a flow chart for discriminating between a touch event and a key event, in accordance with one implementation.

The flow chart shown in FIG. 5 can also be used to select modes of operation for a device. When a touch event is detected, a device can be placed into touch mode. When a key press event (sometimes referred to as a type event) is received, a device can be placed into type mode. These modes can be triggered by the user input detector described above. When a key press event is determined, the user input detector can place a device in type mode. When a touch event is determined, the user input detector can place the device in touch mode.

The sensor data discussed in FIG. 5 can be provided by a variety of different sensors. For example, the sensor data could be gathered by a camera sensor(s), by a capacitive sensor(s), by an optical sensor(s), or by other types of sensor.

It should also be noted that a change in mode can be implemented by a keyboard shortcut or by a gesture defined by either the user or pre-defined by the system.

Another change in mode that can be implemented is a change from single-finger mode to multi-finger mode. Performing a touch operation with one finger allows a system to determine single-touch gestures, e.g., click, swipe, and drag, that are to be utilized. Performing a touch operation with multiple fingers allows a user to perform multi-touch gestures, such as pinch, multiple-fingers-swipe, and pivotal rotation. Thus, in one implementation, the system provides both a multi-finger mode and a single-finger mode. Multi-finger mode is initiated when coordinates of more than one fingertip (or other user input object) are detected. Single-finger mode is initiated when coordinates of just a single fingertip (or other user input object) are detected. While in multi-finger mode, the hover feature can be disabled. The hover feature can be maintained when the system operates in single-finger mode. Moreover, while in multi-finger mode, a single touch event can be dispatched when a single finger is placed in contact with a touch surface, while a multi-finger touch event is dispatched when multiple fingers are placed in contact with a touch surface.

Figure 6:
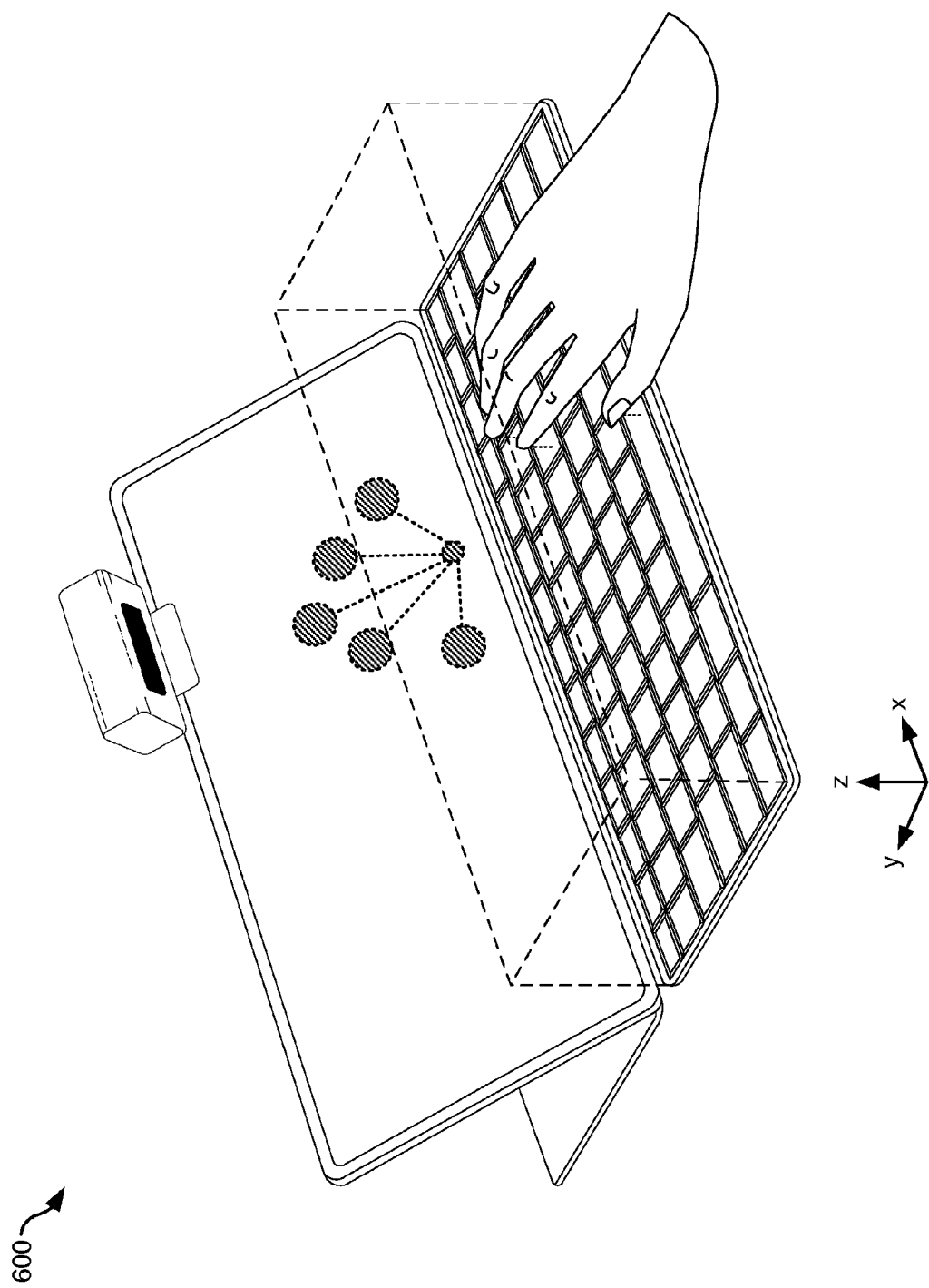
FIG. 6 illustrates a camera serving as a detection sensor above a keyboard, in accordance with one implementation.

FIG. 6 shows an example of a system 600 where a camera system is used as a sensor. The camera sensor is shown coupled with the top of a display screen and oriented at a keyboard surface. The data gathered by the camera can be interpreted to generate position data for user input objects, e.g., a user's fingertips and palm, that are in the 3-dimensional field above a reference surface, such as a keyboard surface. FIG. 6 shows that the fingertip and palm data as it relates to the 2-dimensional reference surface is displayed as display elements on the display screen.

In order to track the fingertip positions in 3-dimensions, a variety of techniques can be used with a camera sensor. For example, stereoscopic disparity mapping, time-of-flight depth mapping, and structured depth mapping may be used.

For example, with stereoscopic cameras, a determination of the 3D structure of a scene or 3D coordinates of objects in the scene can be made using two or more images of the 3D scene, each acquired from a different viewpoint in space. The images are simultaneously analyzed to calculate disparity (distance between corresponding points when the two images are superimposed) either for every point in an image (a disparity map) or for specific points (e.g., fingertips). In addition to the x and y coordinates, which are readily available from the images, z (or depth) can be calculated by using disparity as a measure of distance away from the cameras (the further an object, the smaller the disparity).

Figure 7:
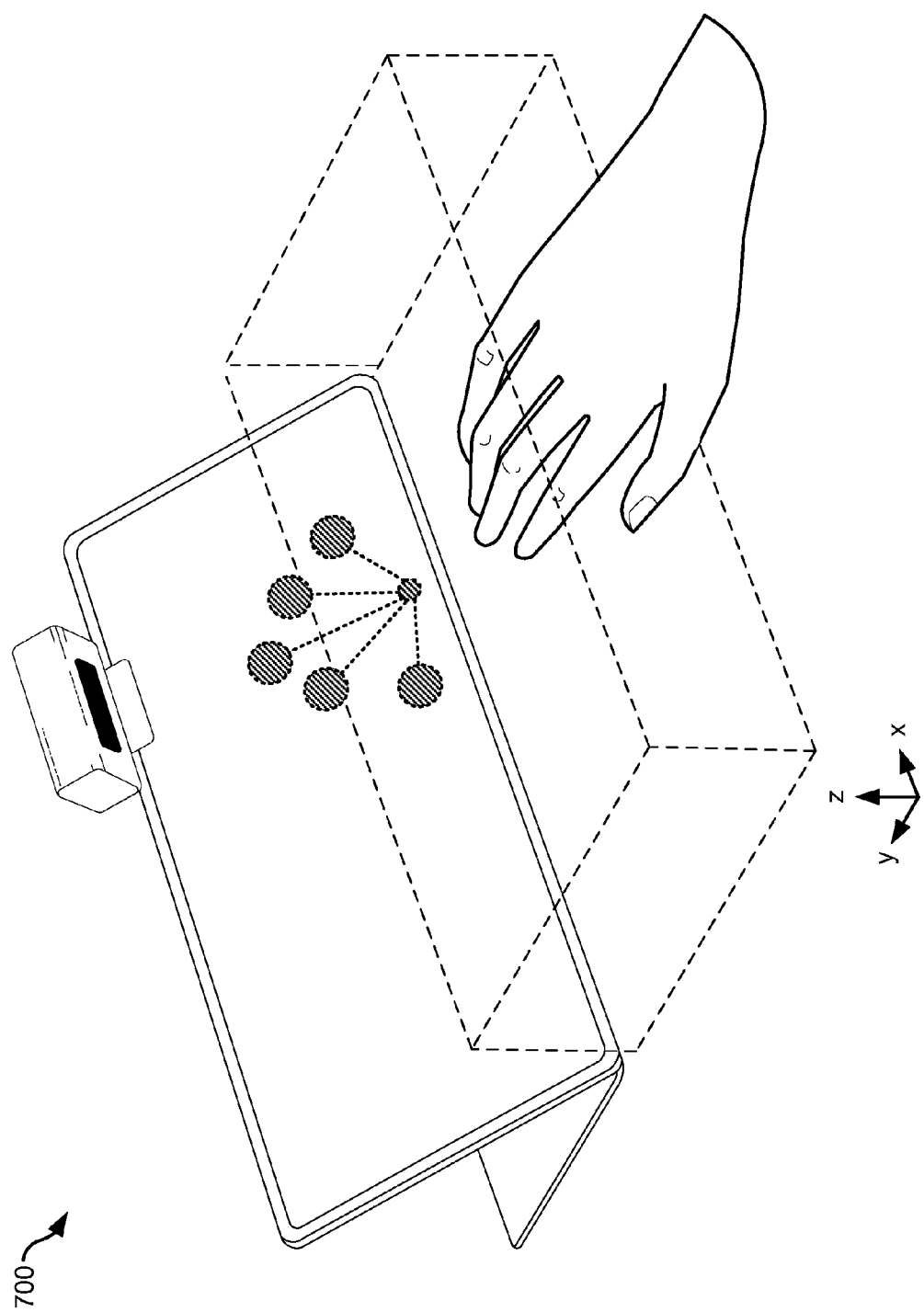
FIG. 7 illustrates detection of user input objects without the use of a keyboard as a reference surface, in accordance with one implementation.

It is not necessary that a keyboard be used as a reference surface. In the computer system 700 of FIG. 7, a display is shown disposed on a supporting structure, such as a desk surface. A 3-dimensional field is shown extending above the desk surface. In this example, the desk surface serves as a 2-dimensional reference surface. Thus, as the user's hand hovers above the desk surface in front of the display, the user's fingertips and palm are displayed as display elements on the display.

Figure 8:
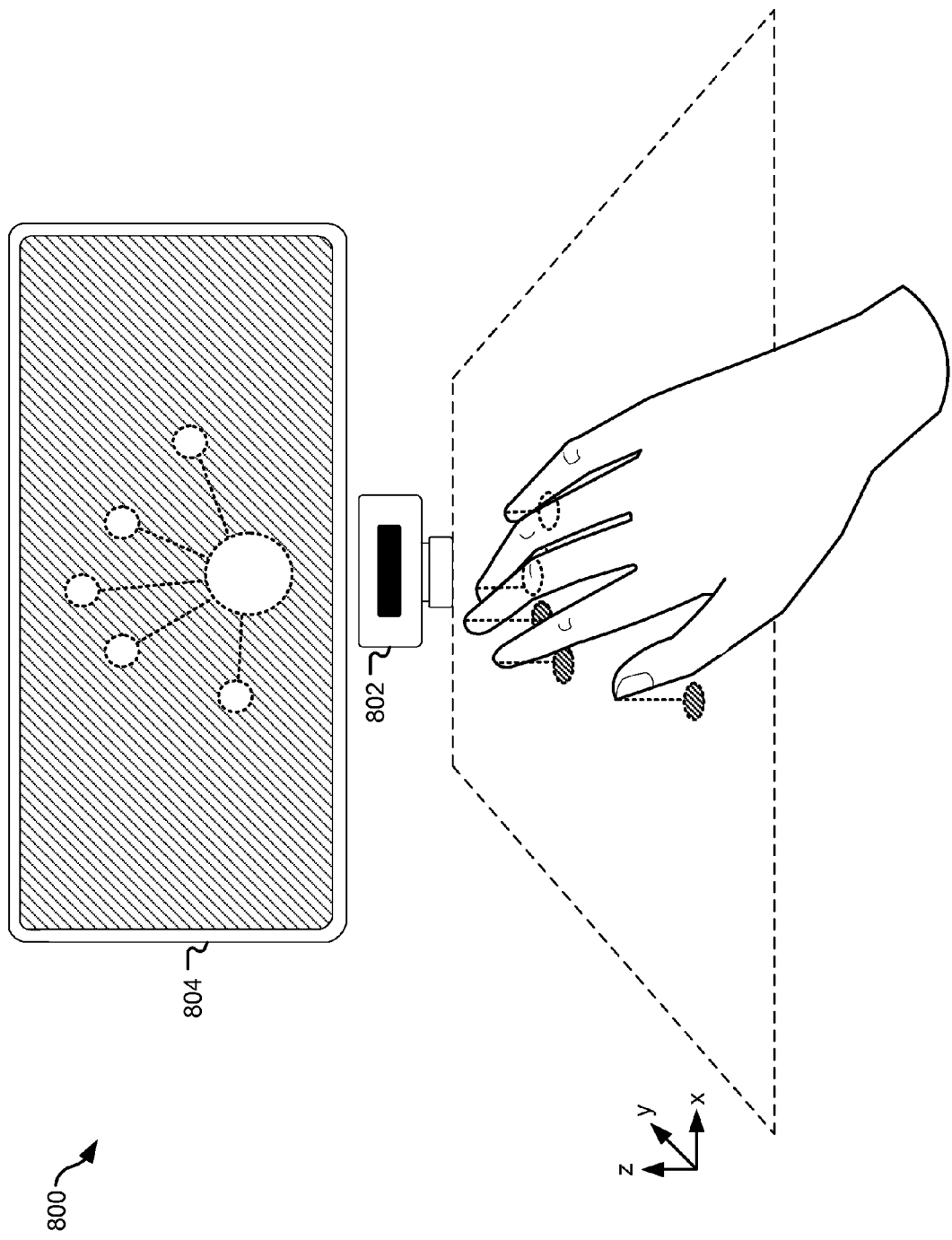
FIG. 8 illustrates another example of detection of a user's fingertips and palm while in hover mode, in accordance with one implementation.

FIG. 8 illustrates that a camera sensor can be placed in different positions to detect user input. FIG. 8 shows a system 800 in which a camera 802 disposed beneath a display screen 804. The camera is oriented at the 3-dimensional field in front of the display screen. Again, in this example, the 2-dimensional reference surface can be any surface. The 2-dimensional surface can even be a virtual plane in space, such as an X-Y plane in an X, Y, and Z coordinate system. Thus, the reference surface need not be an actual physical surface.

Figure 9:
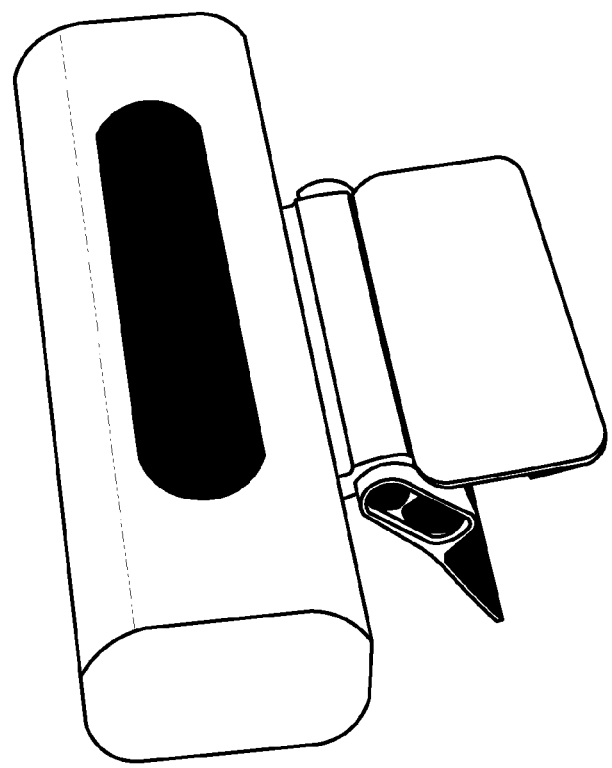
FIG. 9 illustrates a camera sensor that can be used as part of an object detection circuit, in accordance with one implementation.

FIG. 9 illustrates an example of a clip-on camera 900 that can be used as an object detection sensor. The camera shown in FIG. 9 can be clipped on to a computing device, such as a display screen of a laptop computer. Alternatively, the camera can be placed to the side of an area where a user chooses to perform user inputs.

Figure 10B:
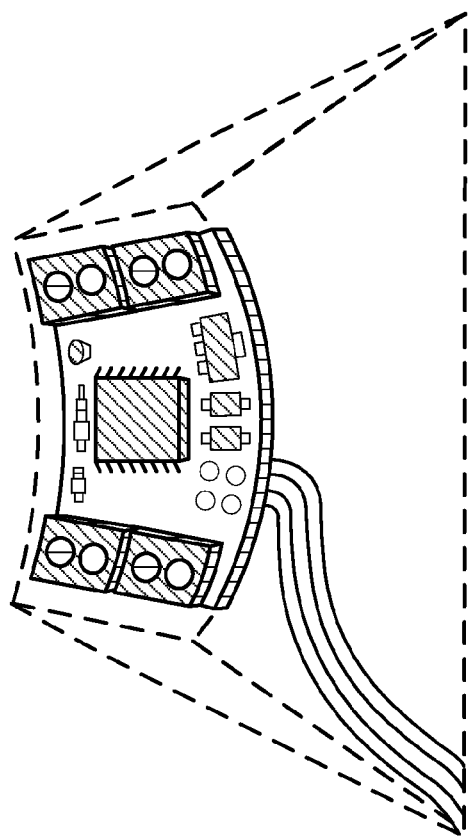
FIGS. 10A and 10B illustrate a key that includes an optical sensor disposed within the key, in accordance with one implementation.
Figure 10A:
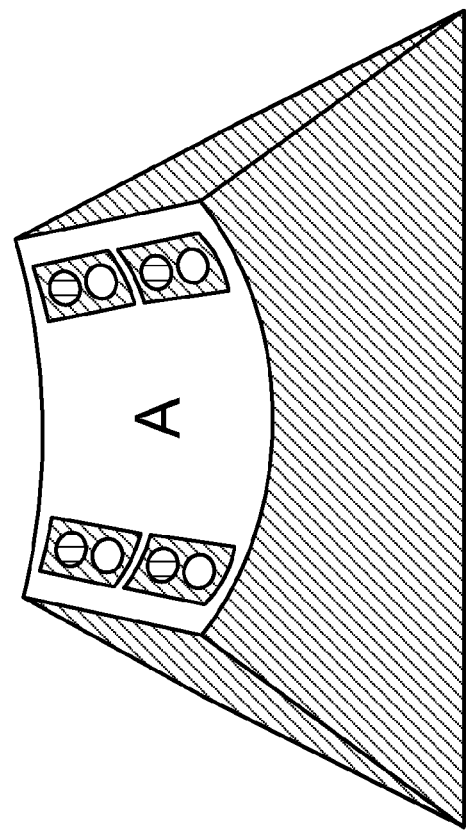

Other types of sensors besides a camera(s) can be used as well to detect user input objects. FIG. 10A illustrates an example of an optical sensor disposed in a key of a keyboard. The optical sensor is shown having four optical proximity sensors soldered to a multiplexer board. Rectangular openings are cut in the keycap in order for the sensors to sense above the surface of the key. FIG. 10B shows such circuitry with the cap of the key removed. The optical sensor detects when objects are disposed above it. A grid of these optical sensors can be disposed in a grid of keys on a keyboard. Thus, as a user moves his or her fingertip above the grid, the sensor that senses the strongest signal will indicate that the user's fingertip is closest to the position of that particular sensor. The system can then compute the X and Y coordinates for the position of the user's fingertip because the system knows the X and Y coordinates of the key in which that particular optical sensor is located. For example, the system can triangulate a more accurate position using signals from multiple sensors. A Z value for the position of the user's fingertip can be determined by comparing the measured optical sensor output value with pre-determined calibration data for that optical sensor. The measured Z value data is sometimes referred to as proximity lines. Again, a proximity value can be determined by triangulation using sensor data from multiple keys. For example, these techniques can be utilized by a coordinate calculator.

Capacitive sensors can also be used. In one implementation, capacitive sensors can be used within keys of a keyboard. The capacitive sensors can be placed in all keys or a selected group of the keys. As user input objects move above the capacitive sensors, sensor data can be collected. This sensor data may then be analyzed, for example, by a coordinate calculator that determines the coordinates of a user input object(s) relative to the keys.

In one implementation, capacitive sensors can be disposed only in keys that form a layout that is proportional to a display surface. In another implementation, the capacitive sensors can be disposed in a layout that is not proportional to the display surface. The sensors can be used to gather data that is used to compute coordinates of user input items present in proximity to the keyboard.

In another implementation, a capacitive sensor grid layout can be disposed underneath a touch pad. The touch pad can be separate from or integrated with a computer or keyboard. Sensors underneath the touch pad can be used to sense proximity of a user input object relative to the sensor grid. The data may then be used to calculate coordinate data for the user input object(s). Capacitive sensors are available, for example, from Cypress Semiconductor or San Jose, Calif.

A processor, memory, sensor, object detector, and coordinate calculator may be integrated with a keyboard. In such an implementation, the keyboard itself can generate coordinate data for a user input object(s).

Other sensors may be used, as well. For example, ultrasonic sensors can be used as sensors. Moreover, micro-electro-mechanical system (MEMS) devices can be used to fabricate sensors that can be disposed in keys or other elements. Still other types of sensors can be used, as well.

When a keyboard is utilized as a sensor grid, not all of the keys need to contain sensors. However, the resolution of a sensor grid matrix implemented via sensors disposed on a keyboard can be increased by increasing the number of sensors of the sensor grid matrix. Since keys on a standard QWERTY keyboard are not arranged in strict columns so as to correspond with the shape of a display device, the system can be configured to interpolate the interactive area delineated by the sensors to the dimensions of the display device. As one example, the interactive area can be defined to be the largest rectangular region that fits within the bounds of the block of sensor keys—assuming that the display screen is also rectangular.

The dataset captured by sensor(s) can be presented in a graphical format that resembles a traditional heat map. This heat map allows detection of multiple inputs simultaneously. For example, a heat map shows an image of a top-down view of proximity sensor locations within an interactive area defined by a sensor grid. Locations closest to the user input objects, e.g., the user's fingertips, show the reddest hues, for example. Other locations show hues that fade into bluer colors where the sensor data is less pronounced. The positions of multiple fingers can be computed either directly or from raw data using simple statistical techniques. The positions can also be computed from the heat map using computer vision techniques, such as blob detection. These techniques can be implemented by the coordinate calculator of the system.

In accordance with one implementation, a system is calibrated by a particular user. In this example implementation, the user places his or her fingertips or other objects on a specified number of points in a 3-dimensional field. For example, the user can touch four points on a reference surface. According to the user's preference, parameters including but not limited to sizes, shapes, colors, and transparency levels of display elements, such as touch cursors, can be selected. During use of the system these parameters are used to indicate proximities and/or positions of fingertips or objects relative to a reference surface.

Figure 11:
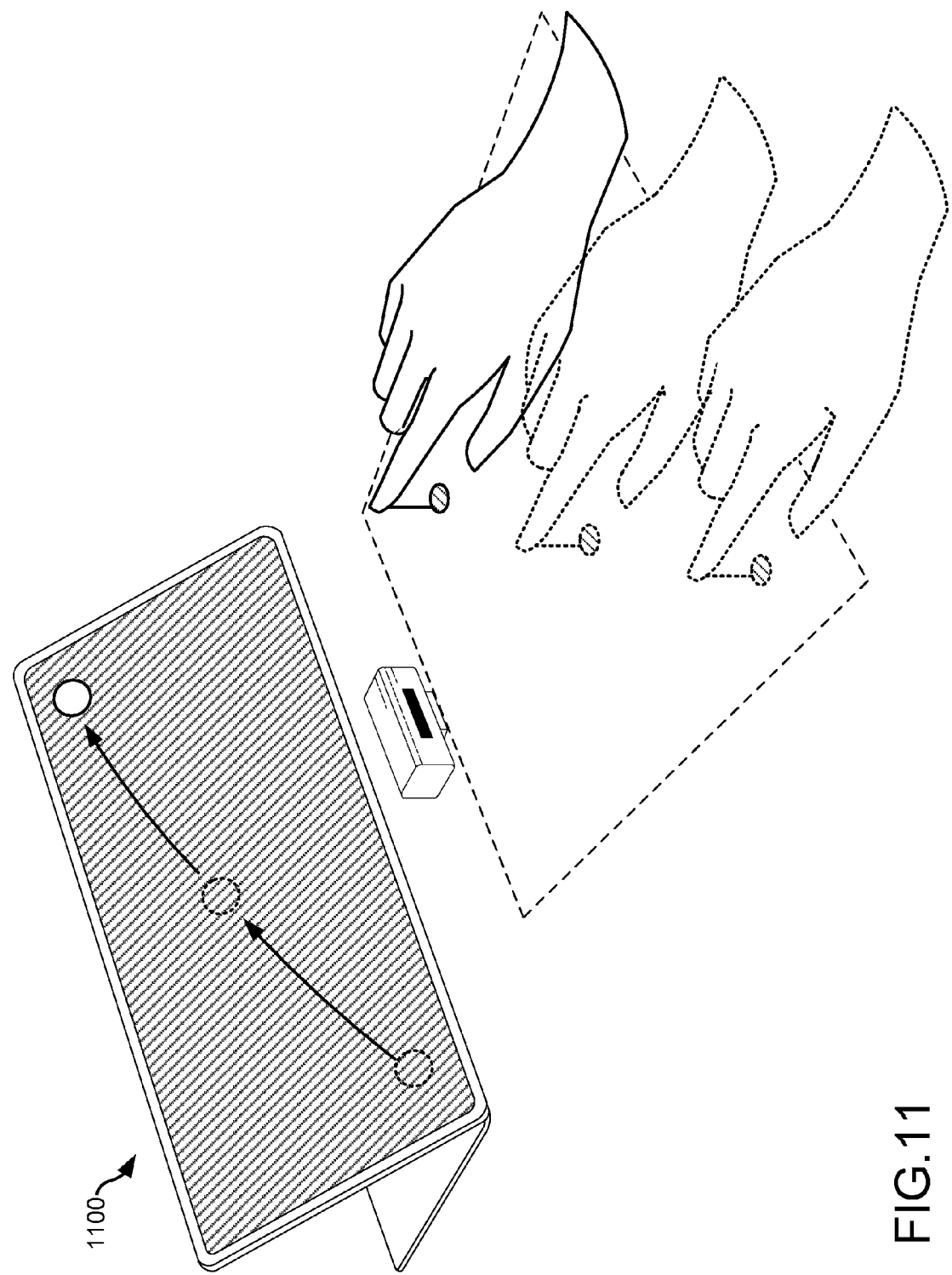
FIG. 11 illustrates tracking of a user input object and display of the user input object on a display screen, in accordance with one implementation.

FIG. 11 illustrates a computer system 1100 and how a user can cause a display element to move across a screen. In FIG. 11 a user's fingertip is detected above the lower left-hand corner of a reference surface. The reference surface is shown in dashed lines. The user's hand and fingertip then move across the reference surface. As the user's hand and fingertip move across the reference surface, an intermediate position is sensed. Eventually, the user's hand and fingertip come to rest at a position above the upper right-hand corner region of the reference surface. FIG. 11 shows that display elements are shown on the display that correspond to the movement of the user's fingertip. Display elements corresponding to previous positions of the user's fingertip can be made to slowly fade from the display while the current position associated with the user's fingertip is displayed in bold outline on the display.

Figure 12:
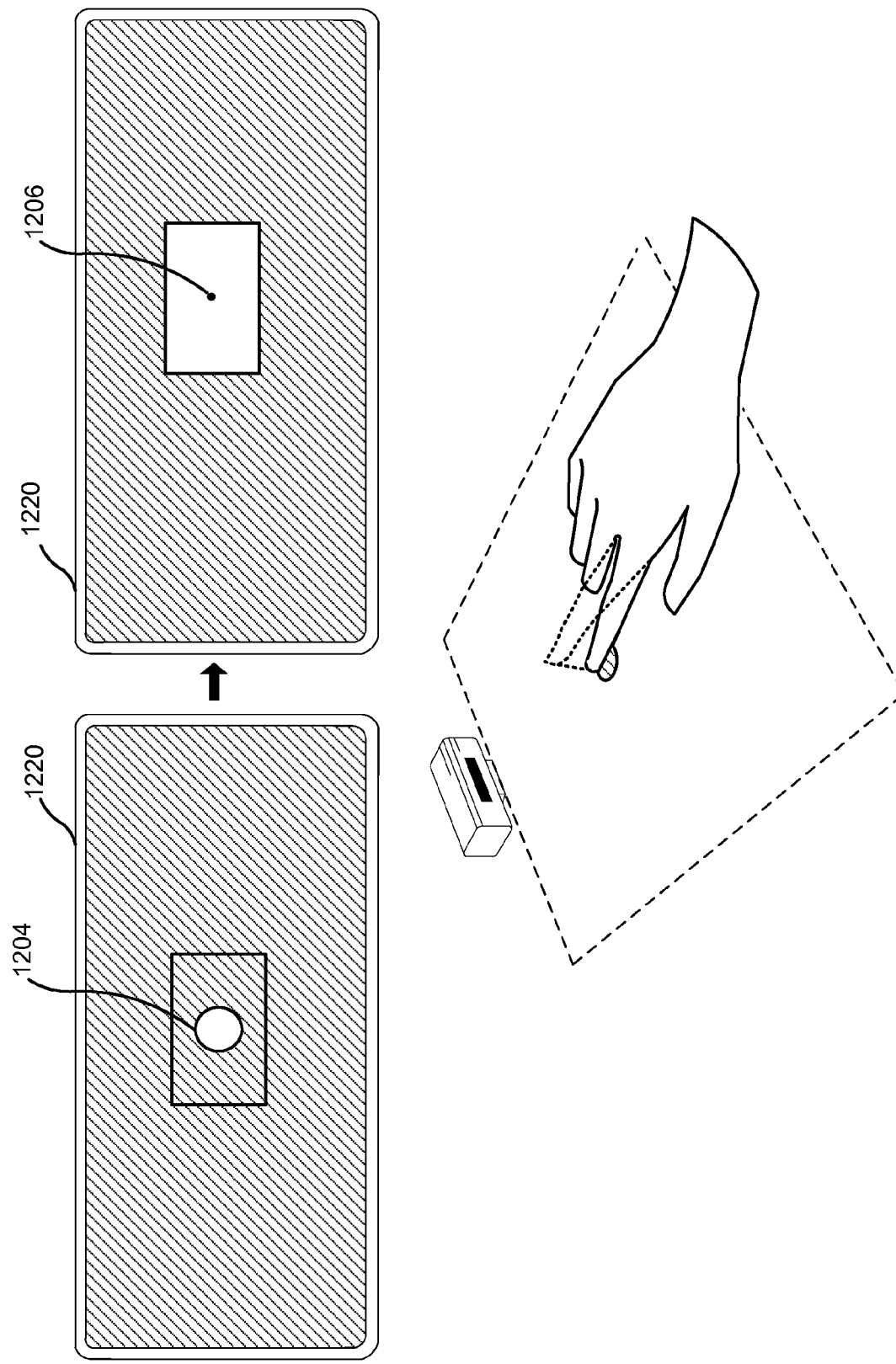
FIG. 12 illustrates a touch event, in accordance with one implementation.

FIG. 12 illustrates another example of how a display element can be changed in response to a change in proximity of a user input object, such as a user fingertip, to a reference surface. The screen 1220 shows a display element 1204 as a circle when a fingertip is positioned above a reference surface. The display element is changed to a circle of smaller diameter as the fingertip is brought closer to the reference surface. When the fingertip is placed very close to the reference surface, the display element becomes a dot 1206.

While a diameter of a circle is used as the varying parameter of the display element in FIG. 12, it should be noted that other parameters could be utilized. For example, a change in size, shape, color, brightness, and transparency could be utilized, among others. Some example transformations include: alpha (transparency index) levels of a display element are inversely proportional to a user input object's corresponding proximity; widths and heights of display elements are directly proportional to a user input object's corresponding proximity; and brightness levels of display elements are directly proportional to a user input object's corresponding proximity. As another example, when a user's fingertips are hovering above a reference surface, the corresponding display elements are semi-transparent circles of a certain color. When the user's fingertips are in contact with a touch surface, the display elements shrink to dark, fine points.

Figure 13:
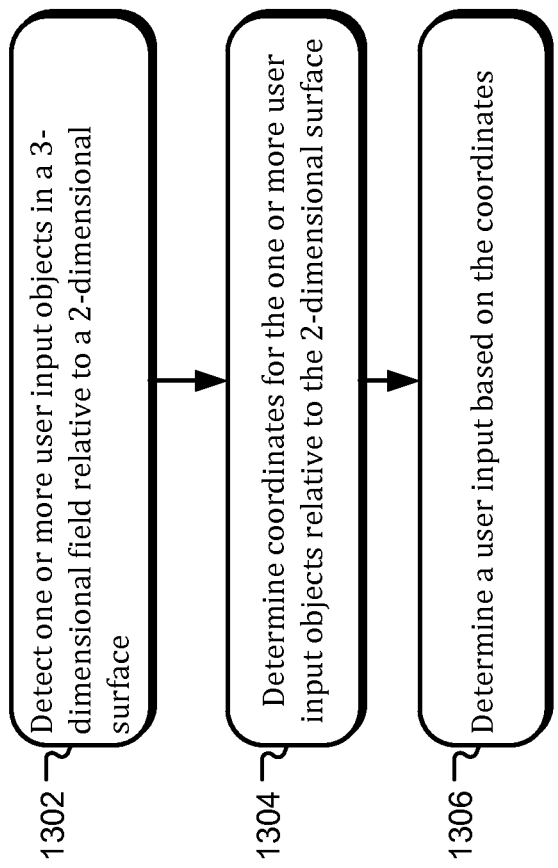
FIG. 13 illustrates a flow chart for a method of determining a user input, in accordance with one implementation.

In FIG. 13, a process of determining a user input is illustrated by a flow chart. In operation 1302, one or more user input objects in a 3-dimensional field are detected relative to a 2-dimensional surface. In operation 1304, coordinates corresponding to a position of at least one of the user input objects relative to the 2-dimensional surface are determined. And, in operation 1306, a user input is determined based on the coordinates.

Figure 14A:
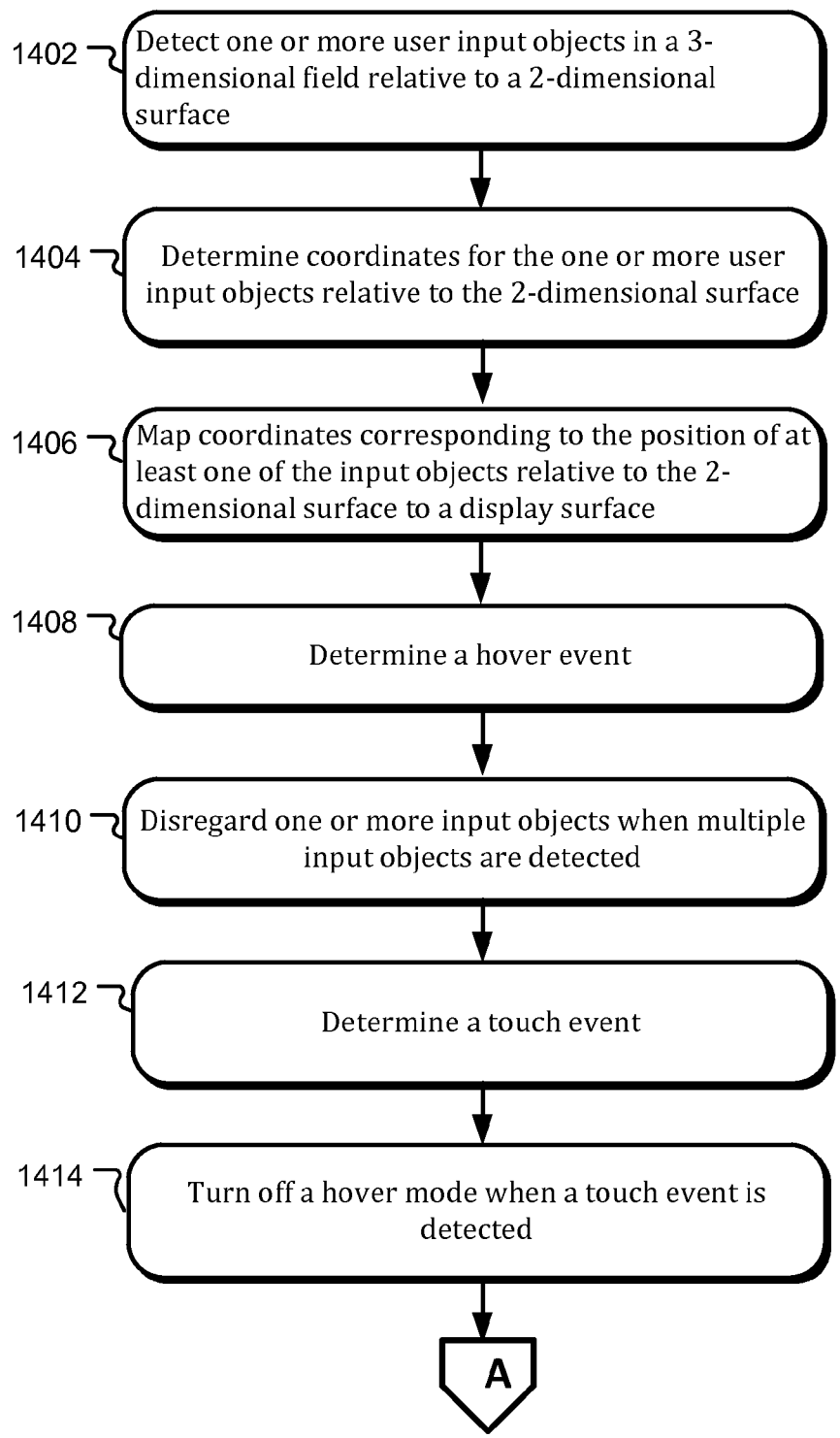
FIGS. 14A and 14B illustrate a flow chart for a method of determining a user input, in accordance with another implementation.
Figure 14B:
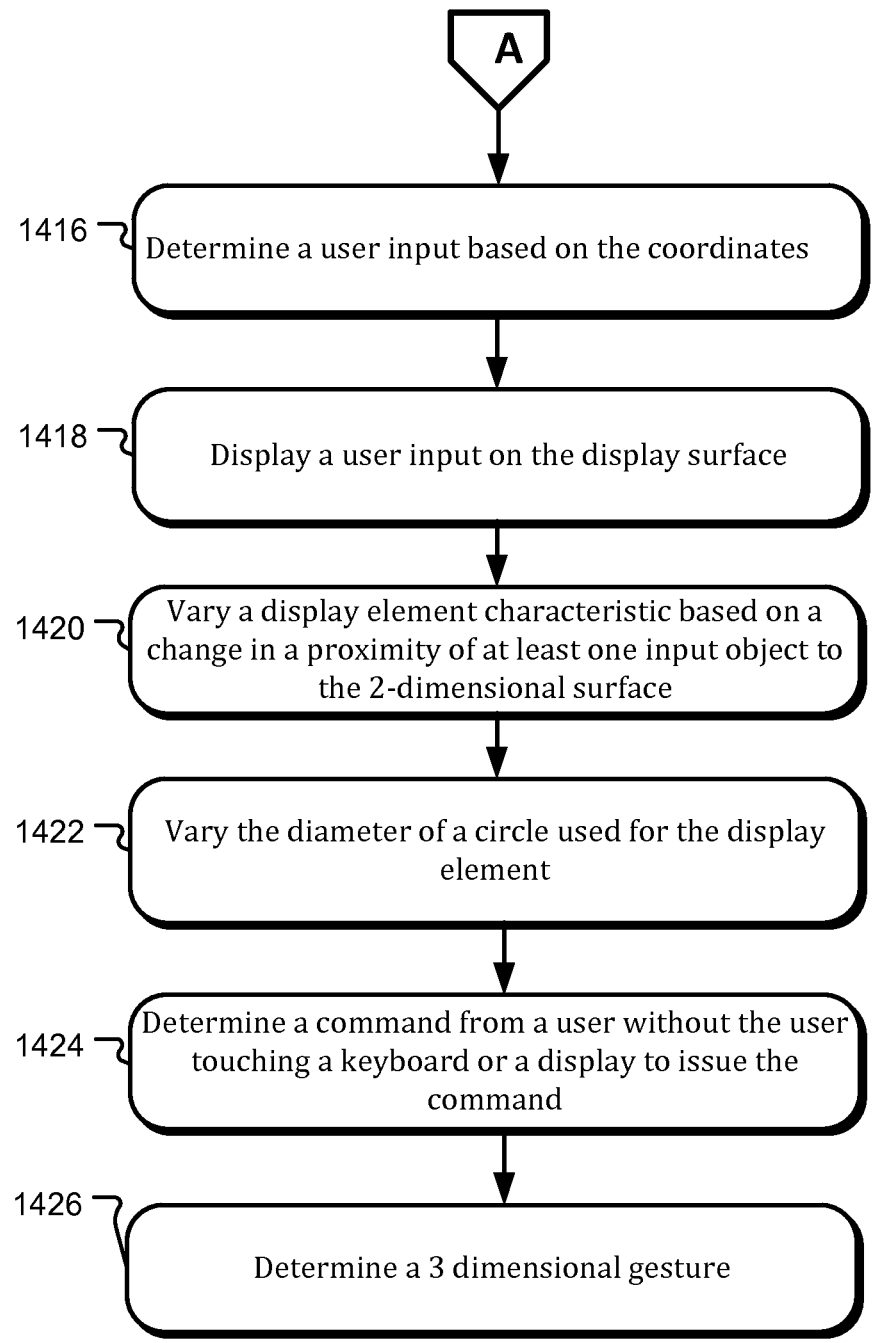

Another implementation of determining a user input is illustrated by FIGS. 14A and 14B. In operation 1402, one or more user input objects are detected in a 3-dimensional field relative to a 2-dimensional surface. In operation 1404, coordinates for one or more user input objects are determined. For example, x, y, and z coordinates can be determined in accordance with an x, y, and z coordinate system. Moreover, the x, y, and z coordinates can be determined relative to the 2-dimensional surface. Other coordinate systems can also be utilized, such as a spherical coordinate system In operation 1406, the coordinates corresponding to the position of at least one of the user input objects is mapped to a display surface. For example, x, y, and z coordinates of a user input object can be mapped to a position for display on a display screen. Moreover, the z coordinate can be used to select the size of a display element to use at the calculated position on the display.

Once coordinates are determined for a user input object, various modes of operation can be determined. For example, operation 1408 shows that the coordinates can be used to determine whether a hover event is taking place. A hover event would be determined if the user interface object is located above a reference surface but not touching the reference surface.

When one or more user interface objects are detected, the system can focus on a particular user input object. For example, when multiple fingertips are detected, the system can disregard some of the user input objects and focus on just one. This is illustrated by operation 1410.

Operation 1412 shows that a touch event can also be detected. A touch event can be detected when a user input object is detected to be at a touch surface for a predetermined period of time. The touch surface can coincide with a physical surface, such as a touchpad or keypad. Alternatively, if no physical input device is available, the touch event can be determined by the user input being detected at an inert surface, such as a table top. The touch event can even be determined by the user input object being present at a predetermined position in space for a predetermined amount of time.

When a touch event is detected, the system can turn off hover mode and input a command indicated by the touch event. This feature is illustrated by operation 1414.

The coordinates of a user input object can also be used to signal a user input. For example, if the system is in hover mode, a display element corresponding to a user input object can be displayed on the display surface. This is illustrated by operation 1418.

In operation 1420, a characteristic of a display element can be varied based on the proximity of a user input object to the 2-dimensional surface. For example, operation 1422 shows that the diameter of a circle used as the display element can be varied depending on how proximate the user input object is to the 2-dimensional surface.

One aspect of the user input determination system is that user inputs can be communicated without a user having to touch a device. Operation 1424 illustrates that a command can be determined from a user without the user touching a keyboard, a mouse, a touchpad, a display, or other physical device in order to issue a command. For example, 3-dimensional gestures can be determined from the coordinates that a user input object moves through during a predetermined period of time. This is illustrated by operation 1426.

Figure 15:
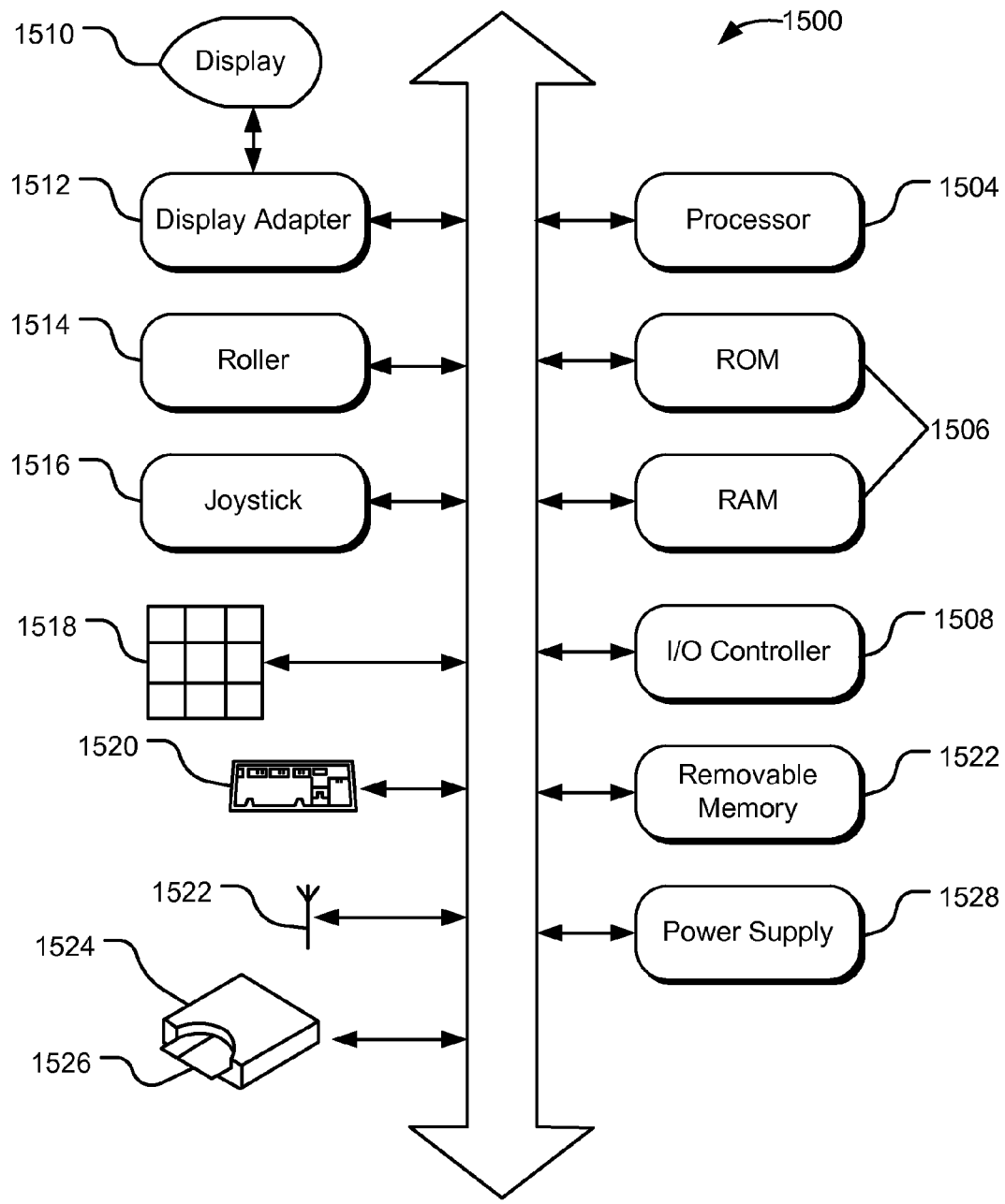
FIG. 15 illustrates a block diagram of a system for implementing a computing device, in accordance with one implementation.

FIG. 15 discloses a block diagram of a computer system 1500 suitable for implementing aspects of at least one implementation. The computer system 1500 can be used to implement one or more components of the user input determination system disclosed herein. For example, in one implementation, the computer system 1500 can be used to implement the computing system 120, display 140, camera 110, and keyboard 108 of FIG. 1.

As shown in FIG. 15, system 1500 includes a bus 1502 which interconnects major subsystems such as a processor 1504, internal memory 1506 (such as a RAM or ROM), an input/output (I/O) controller 1508, removable memory (such as a memory card) 1522, an external device such as a display screen 1510 via a display adapter 1512, a roller-type input device 1514, a joystick 1516, a numeric keyboard 1518, an alphanumeric keyboard 1520, smart card acceptance device 1524, a wireless interface 1526, and a power supply 1528. Many other devices can be connected. Wireless interface 1526 together with a wired network interface (not shown), can be used to interface to a local or wide area network (such as the Internet) using any network interface system known to those skilled in the art.

Many other devices or subsystems (not shown) can be connected in a similar manner. Also, it is not necessary for all of the devices shown in FIG. 15 to be present to practice an implementation. Furthermore, the devices and subsystems can be interconnected in different ways from that shown in FIG. 15. Code to implement one implementation can be operably disposed in the internal memory 1506 or stored on storage media such as the removable memory 1527, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an implementation of the computer system 1500, code for implementing the user input determination system can be stored in the internal memory 1506 and configured to be operated by the processor 1504.

In the above description, for the purpose of explanation, numerous specific details are set forth in order to provide a thorough understanding of the implementations described. It will be apparent, however, to one skilled in the art that these implementations can be practiced without some of these specific details. For example, while various features are ascribed to particular implementations, it should be appreciated that the features described with respect to one implementation can be incorporated with other implementations as well. By the same token, however, no single feature or features of any described implementation should be considered essential, as other implementations can omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application- and business-related constraints, and that those specific goals will vary from one implementation to another and from one developer to another.

According to one implementation, the components, process steps, and/or data structures disclosed herein can be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or a combination thereof. The software can be stored on a program storage device readable by a machine.

According to one implementation, the components, processes and/or data structures can be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows 8, Windows 7, Windows Vista™, Windows NT®, Windows XP PRO, and Windows® 2000, available from Microsoft Corporation of Redmond, Wash., Apple OS X-based systems, available from Apple Inc. of Cupertino, Calif., BlackBerry OS, available from Blackberry Inc. of Waterloo, Ontario, Android, available from Google Inc. of Mountain View, Calif. or various versions of the Unix operating system such as Linux available from a number of vendors. The method can also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment can be networked locally, or over the Internet or other networks. Different implementations can be used and can include other types of operating systems, computing platforms, computer programs, firmware, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, can also be used without departing from the scope and spirit of the inventive concepts disclosed herein.

The above specification, examples, and data provide a complete description of the structure and use of exemplary implementations. Since many implementations can be made without departing from the spirit and scope of the invention, the invention resides in the claims hereinafter appended. Furthermore, structural features of the different implementations can be combined in yet another implementation without departing from the recited claims.

What is claimed is:

1. An apparatus comprising:
   a device comprising one or more physical keys;
      wherein each of said one or more physical keys comprise a keycap;
      wherein each of said one or more physical keys are disposed in a keyboard one or more capacitive sensors disposed in the one or more physical keys;
   an object detector configured to detect one or more user input objects in a 3-dimensional detection field above the one or more keys
      wherein said 3-dimensional detection field is defined by an upper perimeter, a lower perimeter, an inner perimeter, an outer perimeter, a first side perimeter, and a second side perimeter
      wherein said inner perimeter intersects said lower perimeter, said upper perimeter, said first side perimeter, and said second side perimeter;
      wherein said outer perimeter intersects said lower perimeter, said upper perimeter, said first side perimeter, and said second side perimeter;
      wherein said upper perimeter intersects said inner perimeter, said outer perimeter, said first side perimeter, and said second side perimeter;
      wherein said lower perimeter intersects said inner perimeter, said outer perimeter, said first side perimeter, and said second side perimeter;
      wherein said first side perimeter intersects said inner perimeter, said outer perimeter, said upper perimeter, and said lower perimeter;
      wherein said second side perimeter intersects said inner perimeter, said outer perimeter, said upper perimeter, and said lower perimeter.

2. The apparatus of claim 1 wherein the object detector is further configured to determine coordinates of one or more input objects relative to the one or more keys.

3. The apparatus of claim 2 and further comprising:
   a user input detector configured to determine a user input based on the coordinates.

4. The apparatus of claim 3 and further comprising:
   a processor.

5. The apparatus of claim 2 wherein the device comprising one or more physical keys, the one or more capacitive sensors, the object detector, and the processor are integrated as a single device.

6. The apparatus of claim 1 wherein the object detector is configured to track the positions of one or more user input objects in the 3-dimensional detection field.

* * * * *